Figure 1:
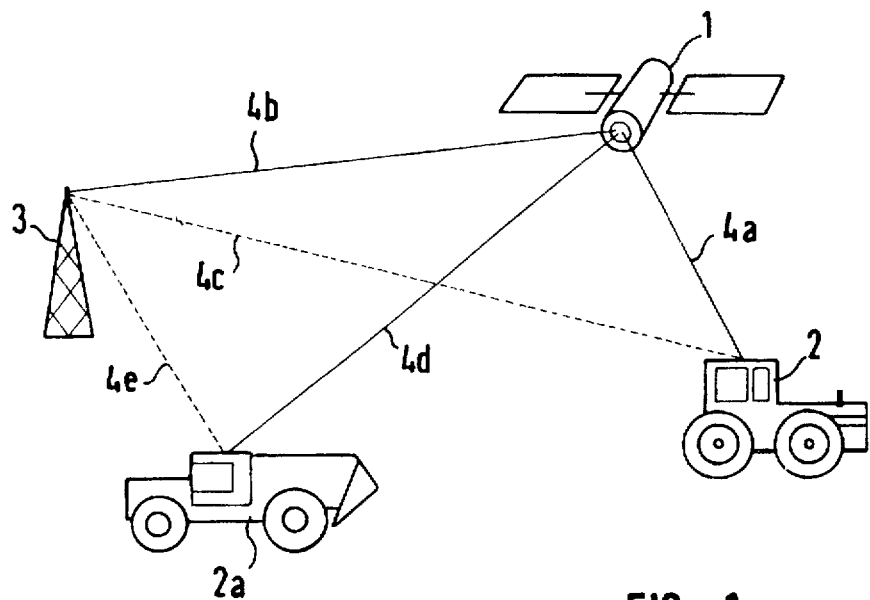

United States Patent [19]

Dürrstein

[11] Patent Number: 5,754,137
[45] Date of Patent: May 19, 1998

[54] PROCESS FOR TAKING ACTION ON PRODUCTIVE LANDS

[76] Inventor: Georg Dürrstein, Bundesstrasse 7, D-97531 Obertheres, Germany

[21] Appl. No.: 795,455

[22] Filed: Feb. 4, 1997

Related U.S. Application Data

[63] Continuation of Ser. No. 403,825, Apr. 20, 1995, abandoned.

Foreign Application Priority Data

Jul. 17, 1993 [DE] Germany .......................... 43 24 048.8
Dec. 10, 1993 [DE] Germany .......................... 43 42 171.7

[51] Int. Cl.⁶ .......................... G01J 5/02; H04N 7/00
[52] U.S. Cl. .......................... 342/357; 348/120
[58] Field of Search .......................... 342/357, 457; 364/424.07, 424.029, 444.2, 449.4, 449.7, 449.8, 449.9; 56/10.2 F; 701/50, 23–28, 207, 213; 348/119, 120, 118

[56] References Cited

U.S. PATENT DOCUMENTS

| | | | |
|---|---|---|---|
| 4,833,480 | 5/1989 | Palmer et al. | 342/125 |
| 5,050,771 | 9/1991 | Hanson et al. | |
| 5,220,876 | 6/1993 | Monson et al. | |
| 5,334,987 | 8/1994 | Teach | 342/357 |
| 5,375,663 | 12/1994 | Teach | 364/424.07 |
| 5,519,609 | 5/1996 | Kuchenrither et al. | 364/420 |

FOREIGN PATENT DOCUMENTS

| | | |
|---|---|---|
| 0181308 | 5/1986 | European Pat. Off. |
| 0282639 | 9/1988 | European Pat. Off. |
| 3315613 | 10/1986 | Germany |
| 3613195 | 11/1986 | Germany |
| 4111147 | 10/1992 | Germany |
| 2178934 | 2/1987 | United Kingdom |
| WO 8605353 | 9/1986 | WIPO |
| WO 9109375 | 6/1991 | WIPO |

OTHER PUBLICATIONS

J. Ritterbusch, et al.; VELOC: Applications of Real–Time DGPS for Vehicle Fleet Management; pp. 435 to 444, 1991.

H. Auernhammer and T. Muhr, Weihenstephan; The Use Of GPS In Agriculture For Yield Mapping And Tractor Implement Guidance; pp. 455 to 465, 1991.

Andreas Finke; Flottenmanagement mit Zukunft; 1991.

Bartelt Brouér; Positionsbestimmung Landwirtschaftlicher Fahrzeuge; pp. 178 to 197; Apr. 1993.

Peter Reitz; Ertragskartierung; pp. 273 to 275; Jun. 1992.

Ehlert, Jurschik: "Satellitenortung in der agrartechnischen Forschung", 1993, Landtechnik Apr. 1993, pp. 182–184.

Jürschik, Beuche: "Anschlussfahren von Feldmaschinen mit Differential–GPS", 1992, VDI-AGR, Issue 14: Ortung und Navigation Landwirt–schaftlicher Fahrzeuge, pp. 159–173.

Beuche, Hellebrand: "Ortung in der Landwirtschaft", 1993, Landtechnik Apr. 1993, pp. 195–197.

Rudolph M. Kalafus; Elevating Differential GPS To Practice; pp. 475 to 483; 19 Sep. 1991.

(List continued on next page.)

*Primary Examiner*—Gregory C. Issing
*Attorney, Agent, or Firm*—Frank H. Foster; Kremblas, Foster, Millard & Pollick

[57] ABSTRACT

Process for taking action on productive lands, in particular for spreading or removing substances or other objects onto or from patches of soil and/or for surveying patches of soil, in particular pertaining to agricultural productive areas, with a telecommunicating locating system, preferably operating with the aid of satellites, and a working vehicle with a data processing device in which, in communication with the locating system, positional data for the working vehicle are ascertained and stored in real time by the positional data of the working vehicle being processed further in the data processing device during the operational action, in real time in each case, to give the path of the working vehicle traversed within the productive land, and the path being continuously indicated visually by means of an output medium.

25 Claims, 4 Drawing Sheets

OTHER PUBLICATIONS

GEO Research, "Geolink Moves Mapping Into A Whole New Field: Yours", Fall, 1992, Adverstising 1 page.

Peterson "Precision GPS Navigation For Improving Agricultural Productivity" *GPS World*.

Reichenberger et al. "Farm By The Foot" Farm Journal Mar. 1989.

PROCESS FOR TAKING ACTION ON PRODUCTIVE LANDS

This is a continuation of application Ser. No. 08/403,825, filed Apr. 20, 1995, now abandoned.

The invention relates to a process for taking action on productive lands, in particular for spreading or removing substances or other objects onto or from patches of soil and/or for surveying patches of soil, in particular pertaining to agricultural productive areas, with a telecommunicating locating system, preferably operating with the aid of satellites, and a working vehicle with a data processing device in which, in communication with the locating system, positional data for the working vehicle are ascertained and stored in real time.

From GB 2 178 934 A an agricultural husbandry process is known in which, in a first operational phase proceeding from a process value, the crop yield for instance, in conjunction with the ascertainment of the location relative to the particular process value by means of a satellite-controlled locating system a treatment plan for subsequent treatment is drawn up. In the first operational phase a vehicle traverses the field, whereby the position of the vehicle is continuously determined in real time in a processor unit and is assigned to the particular local yield values. At the end of the journey the data are transmitted manually to a second, external processor which edits the data with a view to drawing up a local working plan for the individual patches of the field, according to which the data are recalculated into a working plan for the spreading of fertiliser. These data are apparently supplied manually to a third processor arranged on the vehicle which, in communication with the locating system that registers the position of the working vehicle in real time during treatment of the field, controls the spreading of fertiliser in accordance with said data.

Owing to the continuous registration of the position of the vehicle and the location-specific processor control of the fertilisers spread, with this process it is possible, depending on the accuracy of the positional registration, to fertilise the field in accordance with the local requirements.

But at no time during the journey across the field is it possible for the driver to check whether he has actually fertilised every patch of the field or whether various patches have not yet been traversed. Such patches can only be ascertained very inaccurately after the fertilising process, on the basis of the recorded positional data. Only after this is it possible for reworking of the operational errors to be undertaken, for which purpose the entire fertilising process has to be carried out again, something which is extremely laborious and associated with considerable expense. An optimal working result cannot be obtained with this process.

Consequently the object underlying the invention is to create a process of the type stated in the introduction in which it is possible at any time for the driver of the suitably equipped working vehicle, of no matter what type, to identify in the course of his journey in real time his exact position with reference to the productive land, so that reliable orientation and, where appropriate, correction of the path is possible.

In order to achieve this object with a process of the type stated in the introduction, the invention makes provision such that during the operational action the positional data of the working vehicle are processed further in the data processing device, in real time in each case, to give the path of the working vehicle traversed within the productive land, and the path is continuously indicated visually by means of an output medium. In the course of driving, the particular position of the vehicle is consequently ascertained contemporaneously and output in the form of the path already traversed, so that at any time it is possible for the driver to retrace the path traversed and to check it for driving errors. The latter can then be corrected, whereby the result of the correction is also shown visually. Furthermore, reliable orientation and exact driving in accordance with the indicated map of the path is possible.

This process, based in accordance with the invention on the on-line indication of the path, can be used for the most diverse applications. Within the context of soil treatment or the spreading of substances, fertilisers for example, it has been found to be expedient if within the context of the action a patch of land situated within the productive land, a field for example, is firstly defined in the data processing device, whereby said field is also continuously indicated to the driver visually during the journey. As a result of the real-time indication of the position of the vehicle the driver can then establish at all times whether and where he is located within the chosen patch of land. Equally it is also possible for one or more patches situated within the patch of land which is/are to be excluded from the latter to be defined in the data processing device, said patches also being indicated visually, so that it is possible for the driver to avoid said patches during the journey.

The particular patches can be defined in various ways, for example by manual input of specific coordinates of the patches, by the scanning of maps, or by similar methods. But in accordance with the invention it has been found to be extremely expedient if the particular patches are defined in communication with the locating system by simply driving round the particular patches with the working vehicle, the position of which is continuously registered and logged.

After the patch of land to be treated has been defined it is necessary, for economically and biologically meaningful fertilising, to fertilise in accordance with the nutrient distribution and concentration present within the patch of land, in order to avoid over-fertilising. For this purpose soil samples are taken within the patch to be treated, whereby the position is either specified on the output medium, so that said positions merely have to be traversed. The soil samples may optionally also be removed, whereby as a consequence of the continuous recording of the position of the vehicle the positions of the samples are logged. Instead of the taking of soil samples it is also possible, however, for any other object—for instance, measuring probes, soil markers or similar items—to be spread in a documented way or again traversed and removed. After the soil samples have been analysed, an action plan is drawn up on the basis of the results which is characteristic of the patch of land, which is stored in the data processing device, and in accordance with which the actuators of the spreading device for the fertilisers are automatically controlled by the data processing device. Equally the action plan can also be indicated relative to the patch of land by means of the output medium, so that fertilising in accordance with the plan can be carried out in manually controlled manner.

So that the driver can identify whether he has actually treated all the places in question, something which ultimately depends on the actual width of action of the working vehicle, hence for example on the width of the traced fertiliser trail or such like, in accordance with the invention the path is represented to the driver in the form of the actual width of action in such a way that the actual ratio of treated to untreated area is represented. Provided that the output medium is a monitor, this is effected by means of the cursor of the monitor, which indicates the path in the form of a continuous line, whereby the represented dimension of said cursor is variable in accordance with the actual width of action.

Since the patches of land to be treated are flat only in the rarest cases and mostly exhibit a large number of elevations and depressions, both the ascertainment of the positional data and the indication of the path are effected while taking due account of these terrain-specific uneven areas, for which purpose the Differential Global Positioning System (DGPS) which is used for the satellite-aided ascertainment of position has been found to be appropriate, subject to integration of at least three satellites, the signals from which are processed for the purpose of ascertaining the position.

A further possible application of the process according to the invention consists in the surveying of patches of soil. In this connection the patch of land to be surveyed is driven round with the working vehicle, it being possible, as a consequence of the continuous path indication, for the driver to drive back exactly to the starting-point, so that he always defines a closed patch. A similar procedure is adopted for the defining of patches situated within the patch of land which are not to be taken into account for the calculation of productive area. During the journey the length of the path is ascertained, from which the area of the particular patch or only the net surface area of the patch of land is then calculated in the data processing device and indicated. Since both the ascertainment of the position and the indication of the path are effected while taking due account of the uneven areas of soil, in this way it is possible for very accurate calculations of area to be made.

A further possible application of the process is the documentation of the position of spread and removed objects onto or from the particular patches of soil, something which is required, for example, for the exact positioning of patch markings, measuring devices or similar items. In this connection, on a defined patch of land within the context of a first spreading or removal of the objects, positional data are registered and indicated in communication with the locating system, and the subsequent further traversing of the particular positions is then effected again by indicating the path visually with simultaneous indication of the positions of the objects determined earlier.

In addition, the process according to the invention may also be used for documenting and recording the path of working vehicles of all types, such as buses, heavy goods vehicles, private cars etc. In this connection the data processing device and the monitor serve virtually as a tachograph on which the corresponding map section in which the vehicle is situated is represented as the patch of land to be acted upon. On this map section the path or the driver's position is then indicated to the driver, so that simple orientation is possible. Since the indication of the path or the position is effected very accurately in real time, the problem of 'dead reckoning', which hitherto has resulted in extremely inaccurate indications lagging behind the actual position, is avoided.

With a view to increasing the locating accuracy, the Differential Global Positioning System (DGPS) is employed for determining the position. The DGPS supplies correction signals for the positional data ascertained by the data processing device. The positional data is calculated using at least one fixed station, which is also equipped with sending and receiving devices, and transmits to the data processing device. In this connection a plurality of different signals from various satellites are received simultaneously by the fixed station and the working vehicle, whereby at least three signals are required in each case for, on the one hand, the calculation of the position by means of the data processing device, and, on the other hand, the calculation of the correction signals on the part of the fixed station. The data processing device now selects from the control signals those that match the positional data calculated from the satellite data received by it.

However, as soon as the fixed station and the working vehicle no longer receive the same satellite signals, which may for example be the case if, owing to agricultural conditions, the mobile receiving station is screened off so as to prevent reception from a satellite, it is no longer possible for the correction data corresponding to the satellite data to be communicated to the data processing device, which may result in jumps of position or inaccuracies of location. With this process for determining position the elimination of these disadvantages, which leads to a clear reduction in the locating accuracies, is such that, in accordance with the invention, data are exchanged bidirectionally between the fixed station and the data processing device by means of the sending and receiving units of the fixed station and of the data processing device, whereby the data processing device controls the sending and receiving units of the fixed station and/or requests data. Consequently it is possible, in an entirely targeted manner, for such control data to be requested which are required as a consequence of the satellite data received by the working vehicle potentially being different from the satellite data received by the fixed station. Should the number or the type of the signals received by the working vehicle now change during operation, only the data that correspond to the new signals received are interrogated by the fixed station, provided that such data are available.

Figure 2:
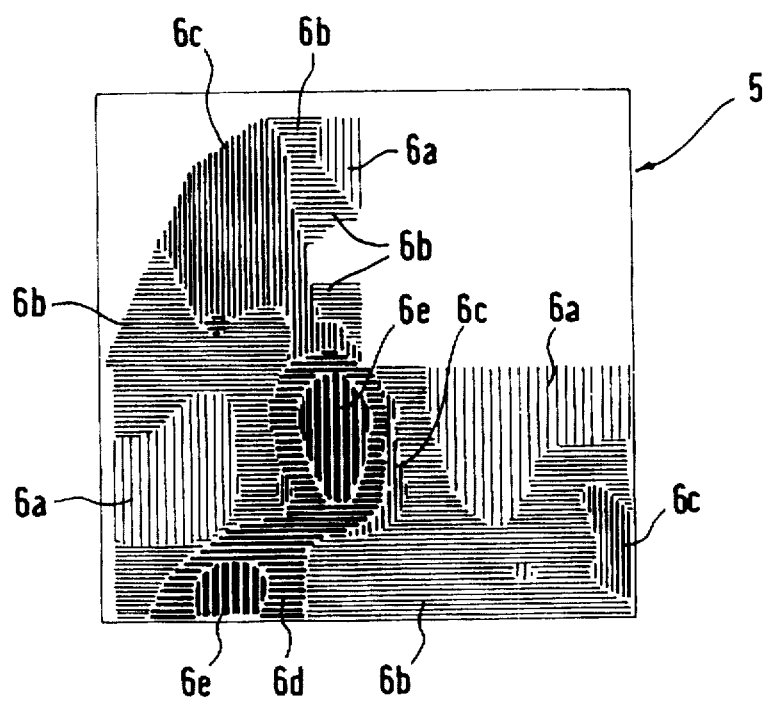
Figure 3:
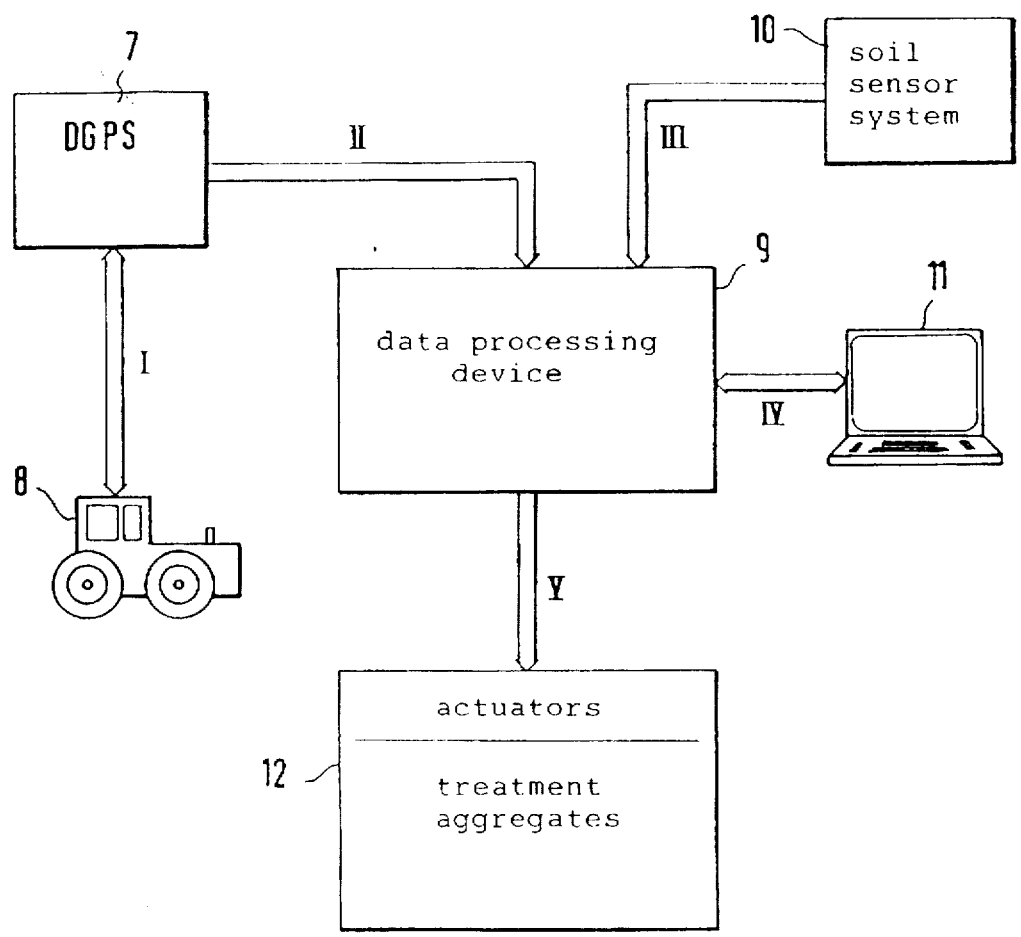
Figure 4:
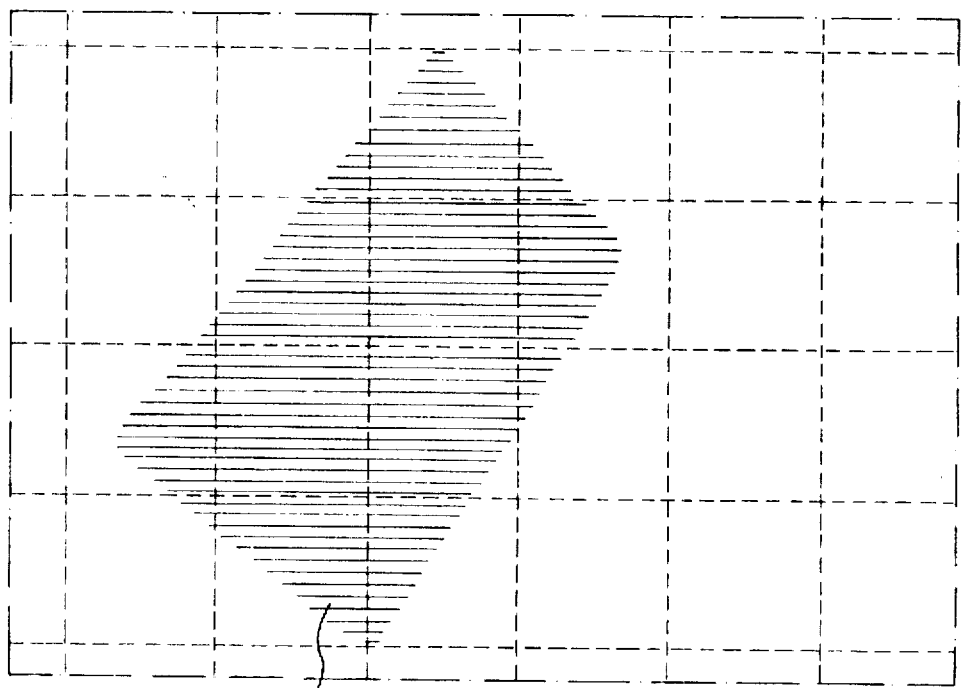
Figure 5:
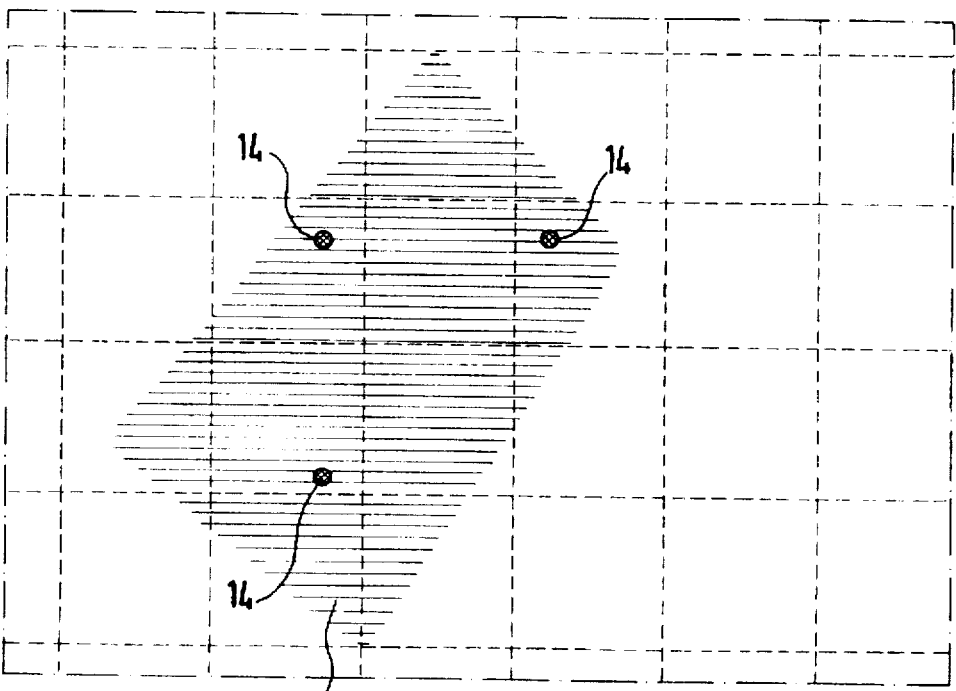
Figure 6:
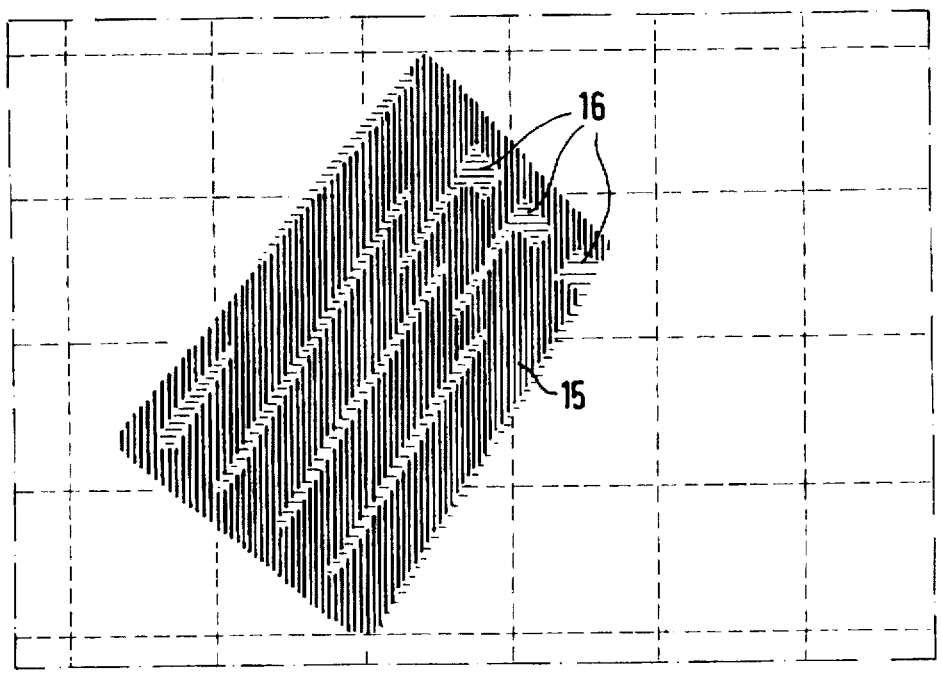
Figure 7:
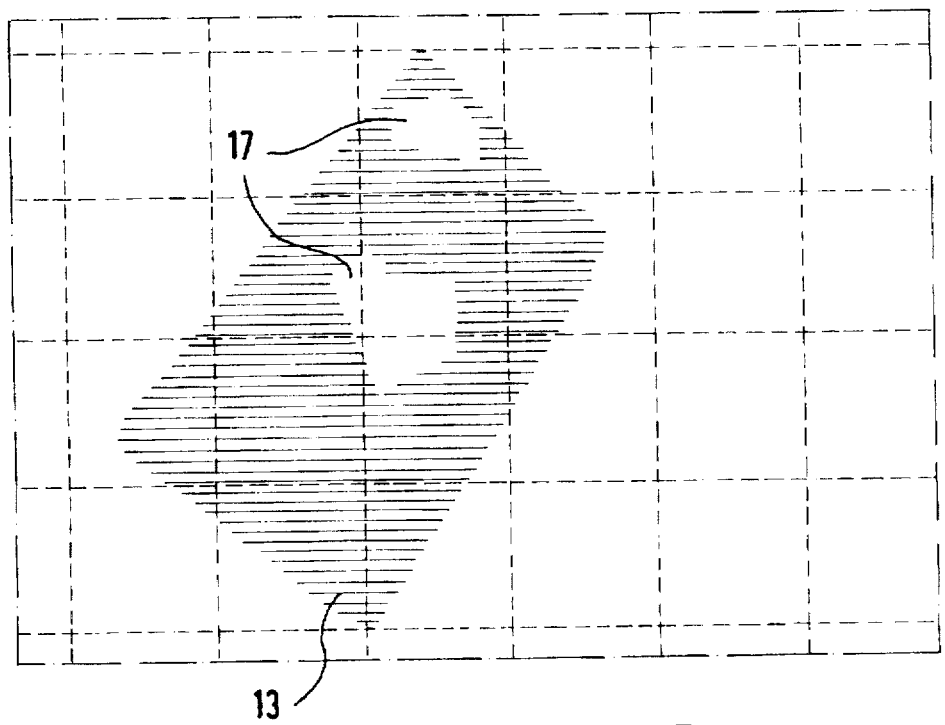

Further advantages, characteristics and details of the process according to the invention will emerge from the exemplary embodiment described below and by reference to the drawings. Illustrated are:

FIG. 1 a schematic diagram of the DGPS,

FIG. 2 a view of the action plan recorded on the monitor which reproduces in coded form the amounts of fertiliser to be spread, FIG. 3 a diagram of the communications networking of the elements participating in the process, FIG. 4 a patch of land represented on the monitor, FIG. 5 the patch of land from FIG. 4 with the locations of the soil samples taken represented, FIG. 6 the patch of land from FIG. 4 or 5 with the path covered represented, and FIG. 7 the patch of land from FIG. 4 with patches excluded from the treatment represented.

FIG. 1 shows schematically the mode of operation of the DGPS. Satellites 1 emit high-frequency radio waves. On the working vehicle 2, which is located on the patch to be treated, a mobile sending and receiving unit is installed, consisting of a data processing device, a radio modem and a satellite receiver. The data processing device calculates positional data from the radio waves 4a emitted from the satellites 1. There is further provided at the edge of the field an additional sending and receiving unit (satellite receiver with radio modem) which as a stationary fixed station 3 receives the same high-frequency radio waves 4b.

This fixed station is needed in order to calculate positional correction data for more accurate locating, whereby for this purpose the accurate position of the site of the fixed station 3 has to be known. In order to be able to program the accurate location of the fixed station 3, the mobile station, which is initially located spatially close to the fixed station 3, ascertains its location as a result of a mathematical calculation of the mean by the data processing device and sends these location coordinates to the fixed station 3. Since the fixed station 3 now knows its own location coordinates, said station can calculate the actual positional correction data and pass them on to the mobile receiving station of the vehicle 2 by radio 4c. These correction data and the location-dependent positional data ascertained by the mobile receiving station are utilised by the data processing device 2 for the calculation of the real-time position of the vehicle 2 with a deviation of less than six metres. In order to achieve this accuracy, both satellite receivers have to be synchronised with respect to the satellites to be received. For this purpose, in accordance with the invention, the individual channels of the mobile receiver are balanced with those of the stationary receiver in the data processing device, so that no uncorrected satellite data can falsify the location. This determination of position is performed every second in the data processing device, so that the driver can make a recording of the patch or can follow his instantaneous vehicle position relative to the boundary of the patch on the monitor by means of a graphical marker.

Shown further is a second vehicle 2a, which can also effect by means of the DGPS a determination of position on the basis of the signal 4d from the satellite 1 and of the signal 4e from the receiving station 3, provided that it is equipped with appropriate receiving and processing devices.

FIG. 2 shows in the form of a sketch the action plan 5 recorded on the monitor, which indicates to the driver in colour-coded form the position-related amounts of fertiliser to be spread. In the example shown the coded patches are represented by various crosshatched areas. On the basis of this plan 5 the driver gathers, for example, that little fertiliser is to be spread in the patches 6a, increasing amounts in the patches 6b, 6c and 6d, and most in the patches 6e. By means of the cursor that is also represented on the monitor the driver can identify his instantaneous position and spread the fertiliser in accordance with the coding 6a–6e. In the disadvantageous state of the art this soil map that is already stored in the computer before the start of the field treatment represents at the same time the non-checkable and consequently merely the purely mathematical ideal result of the fertilising operation, since, as a consequence of the absence of any indication of the route during the spreading, the actual spreading of the required amounts of fertiliser at each location cannot be checked or, where appropriate, subsequently corrected. However, with the process according to the invention, as a consequence of the continuous indication and recording of the path and, where appropriate, by subsequent correction of the spreading, this given target state can be approximately achieved. Advantageous furthermore is the spreading of fertiliser controlled by data processing and the automatic cut-out as soon as the vehicle is located on an area that is not to be fertilised (blocked area). As a result of this it is possible to avoid polluting the environment.

FIG. 3 shows in a graphic way the flow of information or signals during the treatment of the field. By means of the DGPS 7 and the data processing device 9 the position of the vehicle 8 is determined (arrow I) and stored in the data processing device 9 (arrow II). To the latter there are further supplied data relating to the soil sensor system 10 (arrow III). These data comprise in particular the positional data of the soil samples taken for the purpose of determining the soil quality and also the values ascertained therefrom of the required amounts of fertiliser such as are output in coded form by means of the action plan (see FIG. 2). These data may furthermore also comprise the accurate analytical data of the soil samples. The data processing device 9 is networked with a monitor 11 on which the data required by the operator are indicated (arrow IV). It furthermore communicates with actuators 12 pertaining to the treatment aggregates (arrow V) in order by control of the actuators 12 to control, for example, the amounts of fertiliser spread in accordance with the positional data of the vehicle and the data of the soil sensor system 10.

FIGS. 4 to 7 show by way of example the information indicated to the driver on the monitor 11 during treatment of the soil. Firstly the patch of land 13 is indicated to the driver that is defined by driving round a selected patch and determined by its positional data. The data of the particular patch are stored in the data processing device 9. On the basis of this 'field map' overlaid with a grid the driver can then undertake an exact spreading of the fertilisers. After the patch of land 13 has been defined in the manner described above, the farmer has to take samples at a number of places within the treatment area 13, so that as a consequence of the analytical results the action plan already shown in FIG. 2 can be drawn up. The positional data of the soil samples taken are also recorded and stored by the data processing device 9. The individual positions are then indicated on the monitor 11 of the 'field tachograph', as indicated in FIG. 5 by the dots 14. Since the positional data are determined and stored with the aid of the DGPS, a measurement of the internal profile of the field in accordance with reality is ensured. By virtue of the storage of the positional data which, inter alia, constitute a portion of the data of the soil sensor system 10 it is possible for soil samples to be taken again at exactly the same positions after the spreading of the fertiliser, something which is necessary, for example, for checking the success of the fertilising process.

If after the soil samples have been taken the action plan as shown in FIG. 2 is available to the driver, spreading can then take place. Within the context of the spreading the driver traverses the entire patch of land 13, something which is indicated to him on the monitor 11 as he drives, as represented in FIG. 6, where the traversed path 15 can be inferred. In this connection the trail indicated by the width of the cursor in relation to the dimension of the patch of land 13 represented corresponds substantially to the actual width over which the fertiliser is spread relative to the actual size of the patch. Hence the net surface area that is still to be treated is always indicated to the driver, so that certainty exists that the fertiliser has actually been spread on the treated patch indicated. On the basis of the representation those places in the patch of land 13 which are still untreated are immediately apparent to the driver. These places 16 can then be traversed in targeted manner and treated in accordance with the plan, so that the entire patch of land 13 can be fertilised without gaps.

Furthermore it is also possible for the driver to define sub-patches that are not to be treated, whether on account of fertiliser content that is too high or on account of heavy-metal content that is too high, or as a consequence of other legal regulations, and to exclude them from treatment. This is effected in such a way that, after defining the patch of land 13, with a view to defining the patches 17 to be excluded the driver drives round the latter with his vehicle, whereby the positional data are again calculated and stored in the data processing device 9. The patches 17 excluded from the treatment are then indicated on the monitor 11. Since at any time the driver's particular position on the patch 13 is indicated to him by means of the cursor on the monitor 11, he is consequently able to detect reliably when he has arrived with his vehicle at such a patch 17, so that, in case control of the spreading is effected manually, he can switch the spreading off. However, if control is effected via the data processing device 9 then the spreading is interrupted automatically.

I claim:

1. An improved process for taking action on land with a GPS locating system, and a working vehicle with a data processing device in which, in communication with the locating system, positional data for the working vehicle are ascertained and stored in real time, wherein the improvement comprises:
   (a) defining a bounded patch of the land in the data processing device by driving around the periphery of a patch of land while in communication with the locating system; and
   (b) during the action on the land, processing further the positional data of the working vehicle in the data processing device, in real time to give the path of the working vehicle traversed over the land and continuously displaying the entire previously traversed path, including the path width and the patch of land visually by an output medium.

2. A process according to claim 1, wherein at least one patch which is situated within the patch of land and which is to be excluded from the latter is defined in the data processing device and continuously indicated visually.

3. A process according to claim 1, wherein after the defining of the patch of land and, where appropriate, of a patch to be excluded on the patch of land, objects are moved between the land and the working vehicle while the vehicle is in communication with the locating system.

4. A process according to claim 3, wherein the positions at which the objects are moved between the vehicle and the land are indicated visually by means of the output medium upon the visually indicated patch of land.

5. A process according to claim 4, wherein the objects are soil samples to be taken.

6. A process according to claim 5, wherein the soil samples are analyzed and on the basis of the results a local action plan is prepared which is characteristic of the patch of land and compatible with the data processing device.

7. A process according to claim 6, wherein the local action plan is indicated by the output medium relative to the patch of land represented.

8. A process according to claim 6, wherein substances are spread on the patch of land.

9. A process according to claim 6, wherein actuators disposed on the working vehicle are controlled by means of the data processing device.

10. A process according to claim 1, wherein the indication of the path is effected in the form of the actual width of action of the working vehicle on the land and whereby the actual ratio of treated to untreated area is represented.

11. A process according to claim 10, wherein for the purpose of true-to-scale reproduction, the actual width of action can be input variably into the data processing device.

12. A process according to claim 10, wherein during the communication with the locating system the length of the path the working vehicle traversed over the land is ascertained in the data processing device.

13. A process according to claim 1, wherein after the defining of the patch of land and any patch to be excluded, the surface area of the patches are calculated and indicated on the output medium.

14. A process according to claim 13, wherein by way of net area of the patch of land the difference of the surface areas of the patch of land and of the patch to be excluded is calculated and indicated.

15. A process according to claim 14, wherein the output medium is a monitor.

16. A process according to claim 15, wherein the path is indicated on the monitor in the form of a continuous line by means of a cursor which, where appropriate, is variable in its represented dimension.

17. A process according to claim 1 characterized in that the data processing device and/or the output medium is provided, at least prior to the start of the action operation, with an access lock.

18. A process according to claim 17, wherein a security seal is disposed on the data processing device and/or the output medium.

19. A process according to claim 17, wherein at least one code word enabling access or operation is input to the data processing device.

20. A process according to claim 1, wherein the locating system includes a stationary station communicating with the data processing device, and wherein data are exchanged bidirectionally between the fixed station and the data processing device, the data processing device controlling the communication with the fixed station.

21. A process according to claim 20, wherein the fixed station and the data processing device are synchronized with one another in relation to satellite signals received and data to be exchanged.

22. A process according to claim 1, wherein said process is used for the purpose of spreading substances onto agricultural productive areas.

23. A process according to claim 1, wherein said process is used for the purpose of surveying patches of soil pertaining to agricultural productive areas.

24. A process according to claim 1, wherein said process is used for the purpose of documenting and recording the path of working vehicles.

25. A process according to claim 1, wherein said process is used for the purpose of documenting the position of objects moved between the vehicle and patches of soil.

* * * * *